US012429008B1

(12) United States Patent
Khot

(10) Patent No.: US 12,429,008 B1
(45) Date of Patent: Sep. 30, 2025

(54) DUAL FUEL INTERNAL COMBUSTION ENGINE SYSTEM

(71) Applicant: FCA US LLC, Auburn Hills, MI (US)

(72) Inventor: Prashant Ramchandra Khot, Pune (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/787,370

(22) Filed: Jul. 29, 2024

(51) Int. Cl.
*F02D 41/00* (2006.01)
*F02D 19/08* (2006.01)
*F02D 41/30* (2006.01)

(52) U.S. Cl.
CPC ....... *F02D 41/0027* (2013.01); *F02D 19/081* (2013.01); *F02D 41/3094* (2013.01)

(58) Field of Classification Search
CPC . F02D 41/3094; F02D 41/0027; F02D 19/081
See application file for complete search history.

(56) References Cited

U.S. PATENT DOCUMENTS

2002/0185086 A1* 12/2002 Newman ............. F02D 19/0644 123/576

* cited by examiner

*Primary Examiner* — Kevin A Lathers
(74) *Attorney, Agent, or Firm* — Jeremy J. Klobucar

(57) ABSTRACT

A dual fuel internal combustion engine system includes a dual fuel engine, an air intake system configured to provide intake air to the dual fuel engine, a hydrocarbon (HC) fuel system configured to selectively provide HC fuel to the dual fuel engine for combustion therein, and a hydrogen (H2) fuel system configured to selectively provide H2 fuel to the dual fuel engine for combustion therein. A control system includes a controller having one or more processors configured to control the HC fuel system and the H2 fuel system, based on an operating condition of the dual fuel engine, to maximize fuel efficiency and minimize exhaust emissions.

20 Claims, 3 Drawing Sheets

DUAL FUEL INTERNAL COMBUSTION ENGINE SYSTEM

FIELD

The present application relates generally to internal combustion engine systems and, more particularly, to a dual fuel internal combustion engine system that utilizes both hydrogen and hydrocarbon fuel.

BACKGROUND

Internal combustion engines typically utilize hydrocarbon fossil fuel combustion to generate power. However, these fossil fuels are a limited resource and produce undesirable emissions when burned. Other fuels, such as hydrogen or compressed natural gas, provide an alternative to fossil fuels with significantly reduced emissions. However, such alternative fuels often require costly and complex systems and the refueling infrastructure is limited compared to that of conventional gasoline/diesel fuels. Accordingly, while such systems do work well for their intended purpose, there is a desire for improvement in the relevant art.

SUMMARY

In accordance with one example aspect of the invention, a dual fuel internal combustion engine system is provided. In one example implementation, the dual fuel internal combustion engine system includes a dual fuel engine, an air intake system configured to provide intake air to the dual fuel engine, a hydrocarbon (HC) fuel system configured to selectively provide HC fuel to the dual fuel engine for combustion therein, and a hydrogen (H2) fuel system configured to selectively provide H2 fuel to the dual fuel engine for combustion therein. A control system includes a controller having one or more processors configured to control the HC fuel system and the H2 fuel system, based on an operating condition of the dual fuel engine, to maximize fuel efficiency and minimize exhaust emissions.

In addition to the foregoing, the described dual fuel engine system may include one or more of the following features: a H2 fuel injection system including one or more H2 fuel injectors configured to inject H2 fuel into the intake air, and a HC fuel injection system including one or more HC fuel injectors configured to inject HC fuel into the intake air; wherein the H2 fuel injection system is a port fuel injection system configured to inject H2 fuel into an intake port of the dual fuel engine, and wherein the HC fuel injection system is a port fuel injection system configured to inject HC fuel into the intake port; and wherein the H2 fuel system comprises one or more H2 storage tanks configured to store high pressure H2 fuel, and a pressure regulator configured to regulate a pressure of the H2 fuel and reduce the pressure of the high pressure H2 fuel stored in the one or more H2 storage tanks before supplying the H2 fuel to the dual fuel engine.

In addition to the foregoing, the described dual fuel engine system may include one or more of the following features: wherein the H2 fuel system further includes a fuel inlet configured to supply H2 fuel to the H2 fuel system, a main fuel line configured to supply H2 fuel to the dual fuel engine, and a manifold configured to distribute H2 fuel from the fuel inlet to the one or more H2 storage tanks, and from the one or more H2 storage tanks to the main fuel delivery line; and a turbocharger assembly including a compressor and a turbine, an exhaust gas recirculation (EGR) system, and an exhaust system including an exhaust gas conduit with a catalytic converter.

In addition to the foregoing, the described dual fuel engine system may include one or more of the following features: wherein the controller is programmed to monitor an operating condition of the dual fuel engine, determine the dual fuel engine is operating in an idle condition, command an ultra-lean air-fuel ratio, and command a high H2 fuel to HC fuel ratio to maximize fuel efficiency; and wherein the controller is programmed to monitor an operating condition of the dual fuel engine, determine the dual fuel engine is operating in a low engine load condition, command lean air-fuel ratio, and command a high H2 fuel to HC fuel ratio to maximize fuel efficiency.

In addition to the foregoing, the described dual fuel engine system may include one or more of the following features: wherein the controller is programmed to monitor an operating condition of the dual fuel engine, determine the dual fuel engine is operating in a medium engine load condition, command a stoichiometric air-fuel ratio, and command a high HC fuel to H2 fuel ratio to minimize exhaust emissions; and wherein the controller is programmed to monitor an operating condition of the dual fuel engine, determine the dual fuel engine is operating in a high engine load condition, command a rich air-fuel ratio, and command a high H2 fuel to HC fuel ratio to minimize exhaust emissions.

In accordance with another example aspect of the invention, a method of operating a dual fuel internal combustion engine system including a dual fuel engine, an air intake system, a hydrocarbon (HC) fuel system, and a hydrogen (H2) fuel system is provided. In one example implementation, the method includes monitoring, by a controller having one or more processors, an operating condition of the dual fuel engine; commanding, by the controller and based on the engine operating condition, an air-fuel ratio; and commanding, by the controller, the HC fuel system and the H2 fuel system to provide a H2 fuel to HC fuel ratio to maximize fuel efficiency and minimize exhaust emissions based on the engine operating condition.

In addition to the foregoing, the described method may include one or more of the following features: wherein the dual fuel engine system further includes a H2 fuel injection system including one or more H2 fuel injectors configured to inject H2 fuel into the intake air, and a HC fuel injection system including one or more HC fuel injectors configured to inject HC fuel into the intake air; wherein the H2 fuel injection system is a port fuel injection system configured to inject H2 fuel into an intake port of the dual fuel engine, and wherein the HC fuel injection system is a port fuel injection system configured to inject HC fuel into the intake port; and wherein the H2 fuel system includes one or more H2 storage tanks configured to store high pressure H2 fuel, and a pressure regulator configured to regulate a pressure of the H2 fuel and reduce the pressure of the high pressure H2 fuel stored in the one or more H2 storage tanks before supplying the H2 fuel to the dual fuel engine.

In addition to the foregoing, the described method may include one or more of the following features: wherein the H2 fuel system further includes a fuel inlet configured to supply H2 fuel to the H2 fuel system, a main fuel line configured to supply H2 fuel to the dual fuel engine, and a manifold configured to distribute H2 fuel from the fuel inlet to the one or more H2 storage tanks, and from the one or more H2 storage tanks to the main fuel delivery line; and wherein the dual fuel internal combustion engine system further includes a turbocharger assembly including a compressor and a turbine, an exhaust gas recirculation (EGR) system, and an exhaust system including an exhaust gas conduit with a catalytic converter.

In addition to the foregoing, the described method may include one or more of the following features: determining, by the controller, the dual fuel engine is operating in an idle condition; commanding, by the controller, an ultra-lean air-fuel ratio; and commanding, by the controller, a high H2 fuel to HC fuel ratio to maximize fuel efficiency; and determining, by the controller, the dual fuel engine is operating in a low engine load condition; commanding, by the controller, a lean air-fuel ratio; and commanding, by the controller, a high H2 fuel to HC fuel ratio to maximize fuel efficiency.

In addition to the foregoing, the described method may include one or more of the following features: determining, by the controller, the dual fuel engine is operating in a medium engine load condition; command, by the controller, a stoichiometric air-fuel ratio; and command, by the controller, a high HC fuel to H2 fuel ratio to minimize exhaust emissions; and determining, by the controller, the dual fuel engine is operating in a high engine load condition; commanding, by the controller, a rich air-fuel ratio; and commanding, by the controller, a high H2 fuel to HC fuel ratio to minimize exhaust emissions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, typical internal combustion engines utilize hydrocarbons, such as gasoline or diesel, as fuel to produce mechanical power. However, exhaust gas from such combustion often contains unwanted pollutants, which are subsequently converted into less harmful emissions in an exhaust after treatment system. Hydrogen is an alternative, cleaner burning fuel that may be utilized in a hydrogen combustion engine. However, hydrogen fuel is not widely available, making it difficult to use as the only fuel source for the engine. Accordingly, described herein are systems and methods for a dual fuel internal combustion engine system that utilizes both hydrocarbon and hydrogen fuels.

Figure 1:
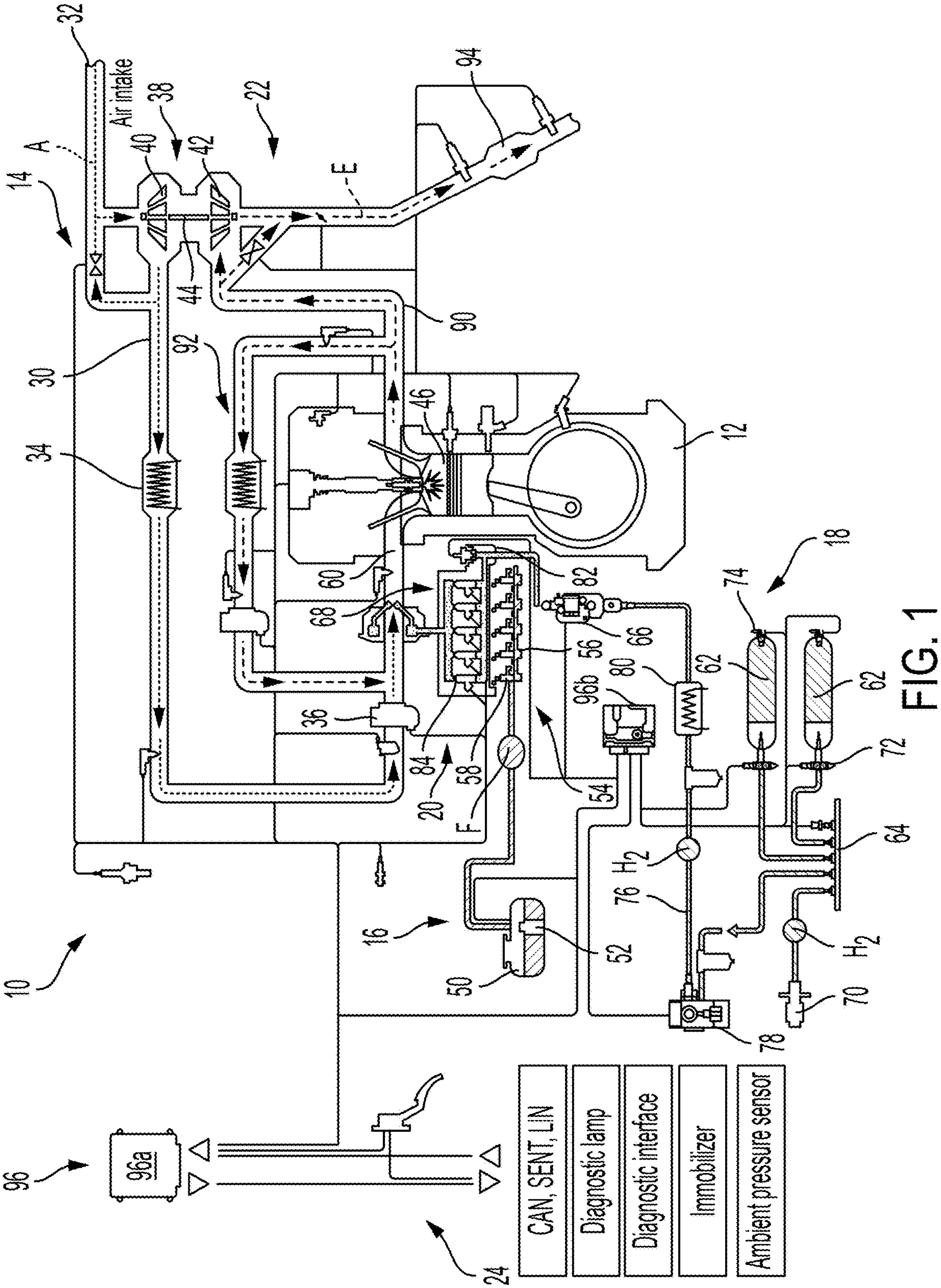
FIG. 1 is a schematic illustration of an example dual fuel internal combustion engine system in accordance with the principles of the present application.

With initial reference to FIG. 1, a schematic diagram of a dual fuel internal combustion engine system is illustrated and generally identified at reference numeral 10. In the example embodiment, the dual fuel engine system 10 generally includes an internal combustion engine 12, an air intake system 14, a hydrocarbon (HC) fuel system 16, a hydrogen (H2) fuel system 18, a fuel injection system 20, and an exhaust system 22. As described herein in more detail, the dual fuel engine system 10 includes a control system 24 configured to operate in various modes with various mixtures of HC fuel, H2 fuel, and air to reduce emissions and increase fuel economy.

With continued reference to FIG. 1, the air intake system 14 generally includes an air intake conduit 30 having an air inlet 32 configured to receive fresh or recirculated air, a heat exchanger (e.g., charge air cooler) 34 for cooling the intake air 'A', and a throttle 36. In some examples, the engine system 10 includes a turbocharger assembly 38, which generally includes a compressor 40 rotatably coupled to a turbine 42 via a shaft 44. The compressor 40 is configured to compress intake air 'A' and includes an inlet configured to receive ambient air, and an outlet in fluid communication with the vehicle engine 12. The turbine 42 is configured to utilize exhaust gas 'E' to rotate the compressor 40 and includes an exhaust inlet configured to receive exhaust gas from the engine 12, and an exhaust outlet fluidly coupled to the exhaust system 22.

As illustrated, the air intake conduit 30 is fluidly coupled to engine 12 via the compressor 40, and the throttle 36 (or other air regulating device) is configured to regulate the amount of air supplied to cylinders 46 (only one shown) of the engine 12. As described herein in more detail, the throttle 36 is configured to adjust the amount of intake air supplied to the cylinders 46 based on the engine operational mode and respective amounts of HC fuel and H2 fuel delivered to the engine intake via the fuel injection system 20.

Figure 2:
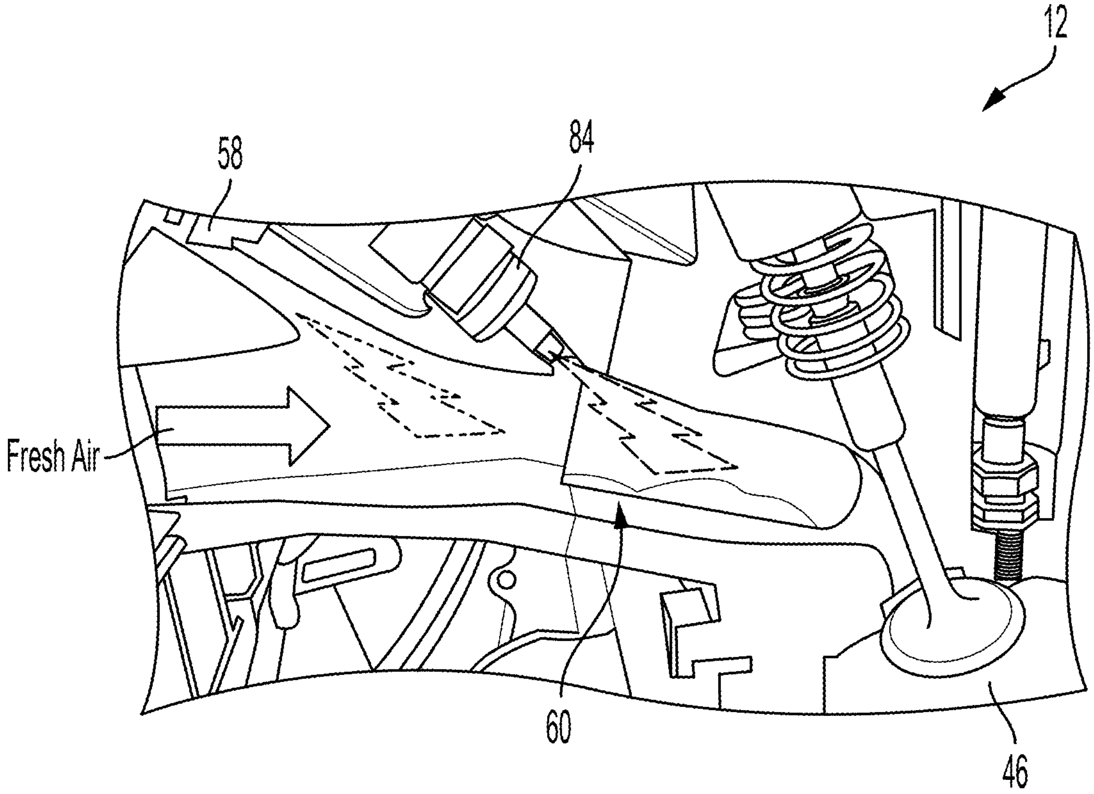
FIG. 2 is a sectional view of an example dual fuel engine of the system shown in FIG. 1, in accordance with the principles of the present application.

The HC fuel system 16 generally includes a fuel tank 50, a low-pressure fuel pump 52, and a HC fuel injection system 54. The fuel tank 50 is configured to store HC fuel. The fuel pump 52 is disposed within the fuel tank 50 and is configured to supply HC fuel 'F' from the fuel tank 50 to the fuel injection system 54. In the example embodiment, the HC fuel injection system 54 is part of the fuel injection system 20 and includes a port fuel injection (PFI) system that includes a HC fuel pressure rail 56 and a plurality of HC fuel injectors 58. As shown in FIG. 2, the HC fuel injectors 58 are configured to supply HC fuel to an intake port 60 where the HC fuel is mixed with H2 fuel and air from the air induction system 12 before being supplied to the cylinders 46.

With continued reference to FIG. 1, the H2 fuel system 18 generally includes one or more H2 storage tanks 62, a manifold 64, a pressure regulator 66, and a H2 fuel injection system 68. A fuel inlet 70 is configured to supply H2 fuel via the manifold 64 for storage in the H2 storage tanks 62. In the example embodiment, the H2 fuel is high pressure hydrogen gas, though other storage mediums (e.g., liquid, solid) may be utilized with system variations. The stored H2 fuel is controlled/monitored by a tank pressure (flow control) valve 72 and a pressure sensor 74.

The manifold 64 is configured to distribute H2 fuel from the fuel inlet 70 to the H2 storage tanks 62, and from the H2 storage tanks 62 to a main fuel delivery line 76. A main shut-off valve 78 is configured to control the flow of H2 fuel through the main fuel delivery line 76. In some examples, valve 78 is configured to determine a quality of the H2 fuel to insure proper attributes. A heat exchanger 80 is disposed on the main fuel delivery line 76 and is configured to control the temperature of the H2 fuel, for example, to improve cold start or hot ambient running to ensure proper temperature of the H2 fuel before it enters the engine 12.

In the example embodiment, pressure regulator 66 is configured to regulate the pressure of the H2 fuel by converting the high-pressure gas (required for storage) into a low-pressure gas circuit before it enters the fuel injection system 68 and engine 12. The fuel injection system 68 is part of the fuel injection system 20 and includes a port fuel injection (PFI) system that includes a fuel pressure rail 82 and a plurality of low-pressure H2 injectors 84. As shown in FIG. 2, the H2 fuel injectors 84 are configured to supply H2 fuel to intake port 60 where the H2 fuel is mixed with HC fuel and air from the air induction system 12 before being supplied to the cylinders 46.

As shown in FIG. 2, the engine 12 includes intake port 60 configured to supply air and fuel to the cylinders 46 for combustion therein. The fuel injection system 20, which includes the HC fuel injection system 54 and the H2 fuel injection system 68, is configured to provide HC fuel and H2 fuel to the engine 12. More specifically, each cylinder intake port 60 includes one HC fuel injector 58 and one H2 fuel injector 84 to selectively provide a predetermined amount of fuel to the intake air.

With continued reference to FIG. 1, exhaust gas produced by combustion of the HC and/or H2 fuel is directed to the exhaust system 22, which generally includes an exhaust gas conduit 90 and an exhaust gas recirculation (EGR) system 92. One or more exhaust gas aftertreatment components 94, such as a catalytic converter, are disposed within the exhaust gas conduit 90 to reduce or convert a desired exhaust gas constituent such as, for example, carbon monoxide (CO), hydrocarbon (HC), and/or nitrogen oxides (NOx). In some operations, a portion of exhaust gas is selectively directed to the EGR system 92 as is known in the art.

As shown in FIG. 1, the dual fuel engine system 10 also includes control system 24, which includes one or more controllers 96 in signal communication with various components, sensors, etc. of the system via a CAN bus. In the illustrated example, control system 24 includes a first controller 96*a* and a second controller 96*b*. The first controller 96*a*, such as an engine control unit (ECU), is configured to control various operations of the engine 12, including metering of intake air via throttle 36 and HC fuel via the HC fuel injectors 58. The second controller 96*b* is configured to monitor and control various operating modes of the H2 fuel system 18, such as filling, storage, and control/supply of H2 fuel via the H2 fuel injectors 84.

Figure 3:
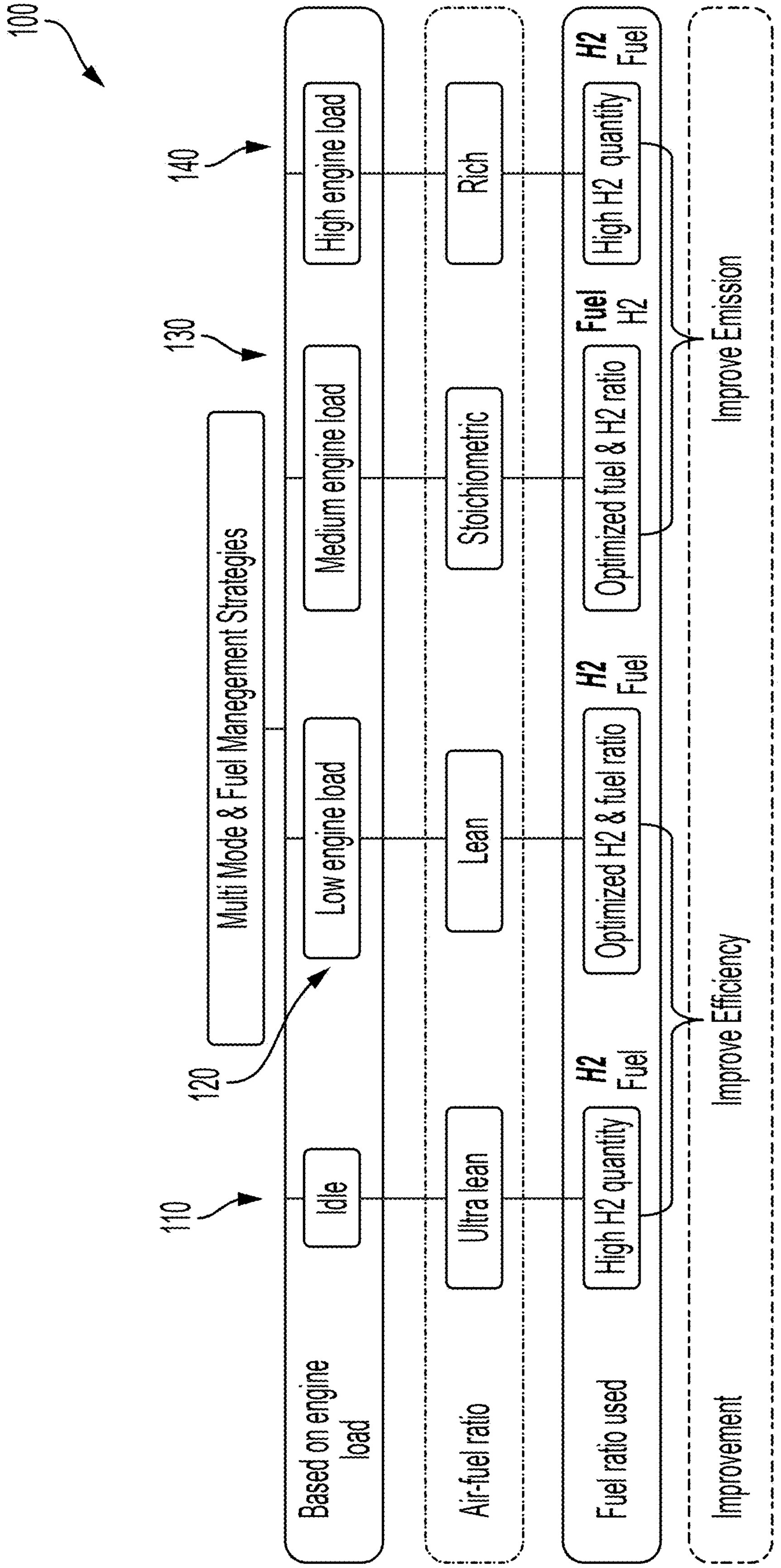
FIG. 3 is graphical illustration of example operational modes of the system shown in FIG. 1, in accordance with the principles of the present application.

With reference now to FIG. 3, an example flow chart of operational modes of the dual fuel engine system 10 is illustrated at 100. In the example embodiment, the control system 24 is configured to operate the dual fuel engine system 10 in (i) an idle mode 110, (ii) a low engine load mode 120, (iii) a medium engine load mode 130, and (iv) a high engine load mode 140.

In the example idle mode 110, controller 96 determines engine 12 is operating in an idle condition. At idle loads, the engine 12 requires less fuel to maintain smooth operation, and a leaner mixture helps improve fuel economy and reduce emissions (e.g., CO and HC). The controller 96 then commands an ultra-lean or stratified ultra-lean air-fuel ratio (e.g., 15.1:1) for high efficiency. In this operation, controller 96 commands the fuel injection system 20 to provide a fuel-fuel ratio (H2 fuel to HC fuel ratio) that is predominantly H2 fuel compared to HC fuel. The fuel-fuel ratio will vary depending on engine type, but is optimized to maximize fuel efficiency. In one example operation, only H2 fuel is supplied to engine 12 while HC fuel injection is prevented.

In the example low engine load mode 120, controller 96 determines the engine 12 is operating at a low load (e.g., low speed conditions, less than 15 mph). At low loads, the engine 12 requires less fuel to maintain smooth operation, and a leaner mixture helps improve fuel economy and reduce emissions. The controller 96 then commands a lean air-fuel ratio (e.g., 14.8-15.0:1) for high efficiency operation. In this operation, controller 96 commands the fuel injection system 20 to provide a fuel-fuel ratio that optimizes H2 fuel compared to HC fuel. The fuel-fuel ratio will vary depending on engine type, but is optimized to maximize fuel efficiency. In one example operation, only H2 fuel is supplied to engine 12 while HC fuel injection is prevented.

In the example medium engine load mode 130, controller 96 determines the engine 12 is operating at a medium load (e.g., steady cruising and low acceleration, medium speed conditions, 15-50 mph). At medium loads, the engine 12 is operated with at or near stoichiometric to provide a balance between performance, efficiency, and emissions. This also provides efficient operation of the catalytic converter 94 to reduce NOx, CO, and HC. The controller 96 then commands a stoichiometric air-fuel ratio (e.g., 14.5-14.7:1). In this operation, controller 96 commands the fuel injection system 20 to provide a fuel-fuel ratio that optimizes HC fuel compared to H2 fuel. The fuel-fuel ratio will vary depending on engine type, but is optimized to improve/minimize emissions. In one example operation, only HC fuel is supplied to engine 12 while H2 fuel injection is prevented.

In the example high engine load mode 140, controller 96 determines the engine 12 is operating at a high load (e.g., high speed or acceleration conditions, or above 50 mph). At high loads, the engine 12 is operated with a rich air-fuel ratio to provide extra fuel to cool the combustion chamber, prevent knocking, and allow for higher power output. The controller 96 then commands a rich air-fuel ratio (e.g., 12.0-13.5:1). In this operation, controller 96 commands the fuel injection system 20 to provide a fuel-fuel ratio that is predominantly H2 fuel compared to HC fuel. The fuel-fuel ratio will vary depending on engine type, but is optimized to improve/minimize emissions. In one example operation, only H2 fuel is supplied to engine 12 while HC fuel injection is prevented.

Accordingly, the air-fuel ratio is dynamically adjusted according to engine load to balance performance, efficiency, and emissions. At low loads, a leaner mixture improves fuel economy and reduces emissions. At medium loads, a stoichiometric mixture maintains a balance between performance and efficiency. At high loads, a rich mixture ensures maximum power and prevents engine damage. The control system 24 continuously monitors and adjusts the air-fuel ratio in response to changing conditions.

Although not shown, dual fuel engine system 10 is also configured to operate in a low H2 fuel mode where the H2 storage tanks have low or no H2 fuel. This may be due to the vehicle not being within range of an H2 refueling station. Under such conditions, the controller 96 is advantageously configured to identify the low/no H2 fuel condition and subsequently operate the engine 12 with only HC fuel until the vehicle can be refilled with H2 fuel.

Described herein are systems and methods for a dual fuel engine system that operates with both H2 fuel and HC fuel. Because H2 fuel generates more energy when combusted than typical HC fuel, some operations are performed solely or mostly with H2 fuel. Thus, depending on the operating condition of the engine, the system is configured to first utilize H2 fuel to improve engine efficiency and reduce emissions, and supplement engine operation HC fuel when necessary or practicable. In this way, H2 fuel quantity can be varied based on different engine operating conditions and overall improvement in emissions and efficiency can be achieved for various types of engines.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A dual fuel internal combustion engine system comprising:

a dual fuel engine;

an air intake system configured to provide intake air to the dual fuel engine;

a hydrocarbon (HC) fuel system configured to selectively provide HC fuel to the dual fuel engine for combustion therein;

a hydrogen (H2) fuel system configured to selectively provide H2 fuel to the dual fuel engine for combustion therein; and a control system including a controller having one or more processors configured to control the HC fuel system and the H2 fuel system, based on an operating condition of the dual fuel engine, to maximize fuel efficiency and minimize exhaust emissions, wherein the controller is programmed to:

monitor an operating condition of the dual fuel engine;

determine the dual fuel engine is operating in a high engine load condition;

command a rich air-fuel ratio; and command a high H2 fuel to HC fuel ratio to minimize exhaust emissions.

2. The dual fuel engine system of claim 1, further comprising:

a H2 fuel injection system including one or more H2 fuel injectors configured to inject H2 fuel into the intake air; and a HC fuel injection system including one or more HC fuel injectors configured to inject HC fuel into the intake air.

3. The dual fuel engine system of claim 2, wherein the H2 fuel injection system is a port fuel injection system configured to inject H2 fuel into an intake port of the dual fuel engine, and wherein the HC fuel injection system is a port fuel injection system configured to inject HC fuel into the intake port.

4. The dual fuel engine system of claim 3, wherein the one or more HC injectors are disposed upstream of the one or more H2 injectors such that the one or more HC injectors inject HC fuel into the intake air upstream of a location where the one or more H2 injectors inject H2 fuel into the intake air.

5. The dual fuel engine system of claim 1, wherein during the high engine load condition, only H2 fuel is supplied to the engine, while HC fuel supply to the engine is prevented.

6. The dual fuel engine system of claim 1, wherein the H2 fuel system comprises:

one or more H2 storage tanks configured to store high pressure H2 fuel; and a pressure regulator configured to regulate a pressure of the H2 fuel and reduce the pressure of the high pressure H2 fuel stored in the one or more H2 storage tanks before supplying the H2 fuel to the dual fuel engine.

7. The dual fuel engine system of claim 6, wherein the H2 fuel system further comprises:

a fuel inlet configured to supply H2 fuel to the H2 fuel system;

a main fuel line configured to supply H2 fuel to the dual fuel engine; and a manifold configured to distribute H2 fuel from the fuel inlet to the one or more H2 storage tanks, and from the one or more H2 storage tanks to the main fuel delivery line.

8. The dual fuel engine system of claim 1, further comprising:

a turbocharger assembly including a compressor and a turbine;

an exhaust gas recirculation (EGR) system; and an exhaust system including an exhaust gas conduit with a catalytic converter.

9. The dual fuel engine system of claim 1, wherein the controller is programmed to:

monitor an operating condition of the dual fuel engine;

determine the dual fuel engine is operating in an idle condition;

command an ultra-lean air-fuel ratio; and command a high H2 fuel to HC fuel ratio to maximize fuel efficiency.

10. The dual fuel engine system of claim 1, wherein the controller is programmed to:

monitor an operating condition of the dual fuel engine;

determine the dual fuel engine is operating in a low engine load condition;

command lean air-fuel ratio; and command a high H2 fuel to HC fuel ratio to maximize fuel efficiency.

11. The dual fuel engine system of claim 1, wherein the controller is programmed to:

monitor an operating condition of the dual fuel engine;

determine the dual fuel engine is operating in a medium engine load condition;

command a stoichiometric air-fuel ratio; and command a high HC fuel to H2 fuel ratio to minimize exhaust emissions.

12. A method of operating a dual fuel internal combustion engine system including a dual fuel engine, an air intake system, a hydrocarbon (HC) fuel system, and a hydrogen (H2) fuel system, the method comprising:

monitoring, by a controller having one or more processors, an operating condition of the dual fuel engine;

commanding, by the controller and based on the engine operating condition, an air-fuel ratio; and commanding, by the controller, the HC fuel system and the H2 fuel system to provide a H2 fuel to HC fuel ratio to maximize fuel efficiency and minimize exhaust emissions based on the engine operating condition, wherein when the controller determines the dual fuel engine is operating in a high engine load condition, the method further includes:

commanding, by the controller, a rich air-fuel ratio; and commanding, by the controller, a high H2 fuel to HC fuel ratio to minimize exhaust emissions.

13. The method of claim 12, wherein the dual fuel engine system further includes:

a H2 fuel injection system including one or more H2 fuel injectors configured to inject H2 fuel into the intake air; and a HC fuel injection system including one or more HC fuel injectors configured to inject HC fuel into the intake air.

14. The method of claim 13, wherein the H2 fuel injection system is a port fuel injection system configured to inject H2 fuel into an intake port of the dual fuel engine, and wherein the HC fuel injection system is a port fuel injection system configured to inject HC fuel into the intake port.

15. The method of claim 12, wherein the H2 fuel system comprises:

one or more H2 storage tanks configured to store high pressure H2 fuel; and a pressure regulator configured to regulate a pressure of the H2 fuel and reduce the pressure of the high pressure H2 fuel stored in the one or more H2 storage tanks before supplying the H2 fuel to the dual fuel engine.

16. The method of claim 15, wherein the H2 fuel system further comprises:

a fuel inlet configured to supply H2 fuel to the H2 fuel system;

a main fuel line configured to supply H2 fuel to the dual fuel engine; and a manifold configured to distribute H2 fuel from the fuel inlet to the one or more H2 storage tanks, and from the one or more H2 storage tanks to the main fuel delivery line.

17. The method of claim 12, wherein the dual fuel internal combustion engine system further includes:

a turbocharger assembly including a compressor and a turbine;

an exhaust gas recirculation (EGR) system; and an exhaust system including an exhaust gas conduit with a catalytic converter.

18. The method of claim 12, further comprising:

determining, by the controller, the dual fuel engine is operating in an idle condition;

commanding, by the controller, an ultra-lean air-fuel ratio; and commanding, by the controller, a high H2 fuel to HC fuel ratio to maximize fuel efficiency.

19. The method of claim 12, further comprising:

determining, by the controller, the dual fuel engine is operating in a low engine load condition;

commanding, by the controller, a lean air-fuel ratio; and commanding, by the controller, a high H2 fuel to HC fuel ratio to maximize fuel efficiency.

20. The method of claim 12, further comprising:

determining, by the controller, the dual fuel engine is operating in a medium engine load condition;

command, by the controller, a stoichiometric air-fuel ratio; and command, by the controller, a high HC fuel to H2 fuel ratio to minimize exhaust emissions.

* * * * *